US012603099B2

(12) United States Patent
Carbune et al.

(10) Patent No.: US 12,603,099 B2
(45) Date of Patent: Apr. 14, 2026

(54) SELF-ADJUSTING ASSISTANT LLMS ENABLING ROBUST INTERACTION WITH BUSINESS LLMS

(71) Applicant: Google LLC, Mountain View, CA (US)

(72) Inventors: Victor Carbune, Zürich (CH); Matthew Sharifi, Kilchberg (CH)

(73) Assignee: Google LLC, Mountain View, CA (US)

( * ) Notice: Subject to any disclaimer, the term of this patent is extended or adjusted under 35 U.S.C. 154(b) by 190 days.

(21) Appl. No.: 18/454,031

(22) Filed: Aug. 22, 2023

(65) Prior Publication Data

US 2025/0069617 A1    Feb. 27, 2025

(51) Int. Cl.
*G10L 25/48*          (2013.01)
*G10L 15/183*         (2013.01)
*G10L 15/22*          (2006.01)

(52) U.S. Cl.
CPC ............ *G10L 25/48* (2013.01); *G10L 15/183* (2013.01); *G10L 15/22* (2013.01); *G10L 2015/223* (2013.01)

(58) Field of Classification Search
CPC ....... G10L 25/48; G10L 15/183; G10L 15/22; G10L 2015/223; G06N 20/00; G06F 16/90332; G06F 16/3329
See application file for complete search history.

(56) References Cited

U.S. PATENT DOCUMENTS

| 7,693,720 B2 * | 4/2010 | Kennewick | ......... G06F 16/3329 |
| | | | 704/270.1 |
| 2024/0111960 A1 * | 4/2024 | Earle | ....................... G06F 40/35 |

| 2024/0249077 A1 * | 7/2024 | Chen | .................... G06N 3/0455 |
| 2024/0257808 A1 * | 8/2024 | Mars | ........................ G10L 15/08 |
| 2024/0282298 A1 * | 8/2024 | Koneru | ................. G10L 15/183 |
| 2024/0311579 A1 * | 9/2024 | Dong | ..................... G06F 40/284 |
| 2024/0347058 A1 * | 10/2024 | Rossi | ....................... G10L 13/08 |
| 2024/0370660 A1 * | 11/2024 | Cha | .......................... G06T 11/00 |

(Continued)

OTHER PUBLICATIONS

Yongliang Shen Et L: "HuggingGPT: Solving AI Tasks with ChatGPT and its Friends in HuggingFace", arvix.org, Cornell University Library, 201 Olin Library Cornell University Ithaca, NY 14853, Mar. 30, 2023 (Mar. 30, 2023), XP091472266.

(Continued)

*Primary Examiner* — Fariba Sirjani
(74) *Attorney, Agent, or Firm* — Honigman LLP; Brett A. Krueger; Grant Griffith

(57)          ABSTRACT

A method includes receiving a natural language query specifying an action for an assistant interface to perform and selecting one or more business large language models (LLMs) for the assistant interface to interact with to fulfill performance of the action. For each business LLM, method also includes accessing an adapter module to structure the natural language query into a respective prompt specifically formulated for the corresponding business LLM, issuing, for input to the corresponding business LLM, the respective prompt, and receiving corresponding response content from the corresponding business LLM that conveys details regarding performance of a corresponding portion of the action. The method also includes presenting, for output from the user device, presentation content based on the corresponding response content received from each corresponding business LLM.

22 Claims, 5 Drawing Sheets

(56) References Cited

U.S. PATENT DOCUMENTS

| | | | |
|---|---|---|---|
| 2024/0403112 A1* | 12/2024 | Mohammed | G06Q 10/06311 |
| 2024/0414191 A1* | 12/2024 | Humphrey | H04L 63/1433 |
| 2024/0425075 A1* | 12/2024 | Elliott | G06N 3/08 |
| 2025/0005046 A1* | 1/2025 | Keenan | G06F 16/288 |
| 2025/0005294 A1* | 1/2025 | Ochs | G06F 40/166 |
| 2025/0005427 A1* | 1/2025 | Venkateswaran | G06N 3/044 |
| 2025/0021767 A1* | 1/2025 | Dharnidharka | G06F 16/90332 |
| 2025/0061138 A1* | 2/2025 | Madisetti | G06F 40/30 |
| 2025/0069617 A1* | 2/2025 | Carbune | G10L 15/183 |

OTHER PUBLICATIONS

Bhargavi Paranjape et al: "ART: Automatic multi-step reasoning and tool-use for large language models", arvix.org, Cornell University Library, 201 Olin Library Cornell University Ithaca, NY 14853, Mar. 16, 2023 (Mar. 16, 2023), XP091464222.

Schick Timo et al: "Toolformer: Language Models Can Teach Themselves to Use Tools", Feb. 9, 2023 (Feb. 9, 2023), pp. 1-17, XP093209657, Retrieved from the Internet: URL: https://arvix.org/pdf/2303.04761.

Richard Macmanus: "How Hugging Face Positions Itself in the Open LLM Stack—The NEw Stack", Jun. 20, 2023 (Jun. 20, 2023), pp. 1-12, XP093224813, Retrieved from the Internet: URL: <https://web.archive.org/web/20230620230953/https://thenewstack.io/how-hugging-face-positions-itself-in-the-open-llm-stack/page> 2, paragraph 1.

International Search Report and Written Opinion issued in related PCT Application No. PCT/US2024/043111, dated Dec. 3, 2024.

* cited by examiner

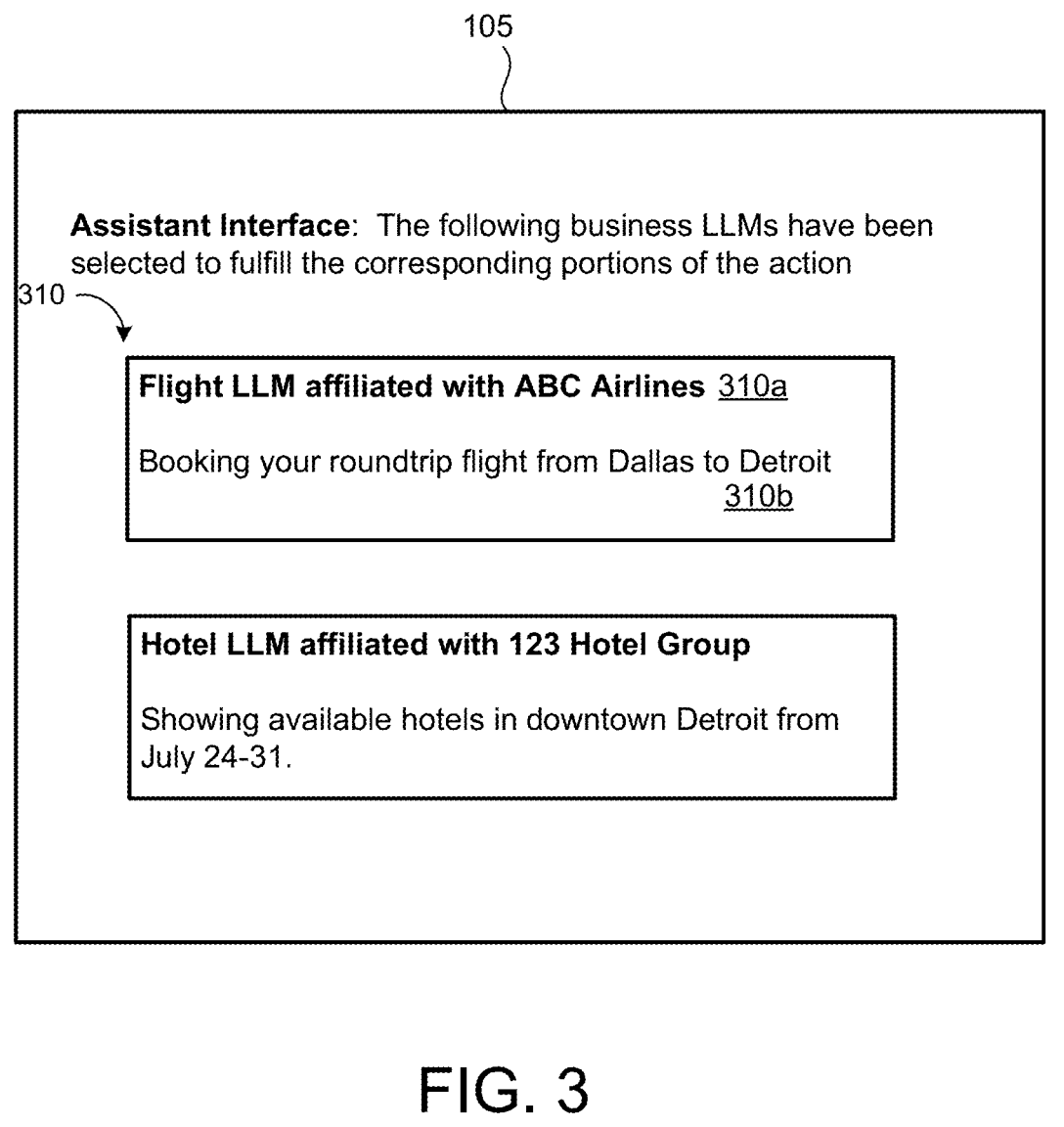

105

Assistant Interface:  The following business LLMs have been selected to fulfill the corresponding portions of the action

310

Flight LLM affiliated with ABC Airlines 310a

Booking your roundtrip flight from Dallas to Detroit

310b

Hotel LLM affiliated with 123 Hotel Group

Showing available hotels in downtown Detroit from July 24-31.

FIG. 3

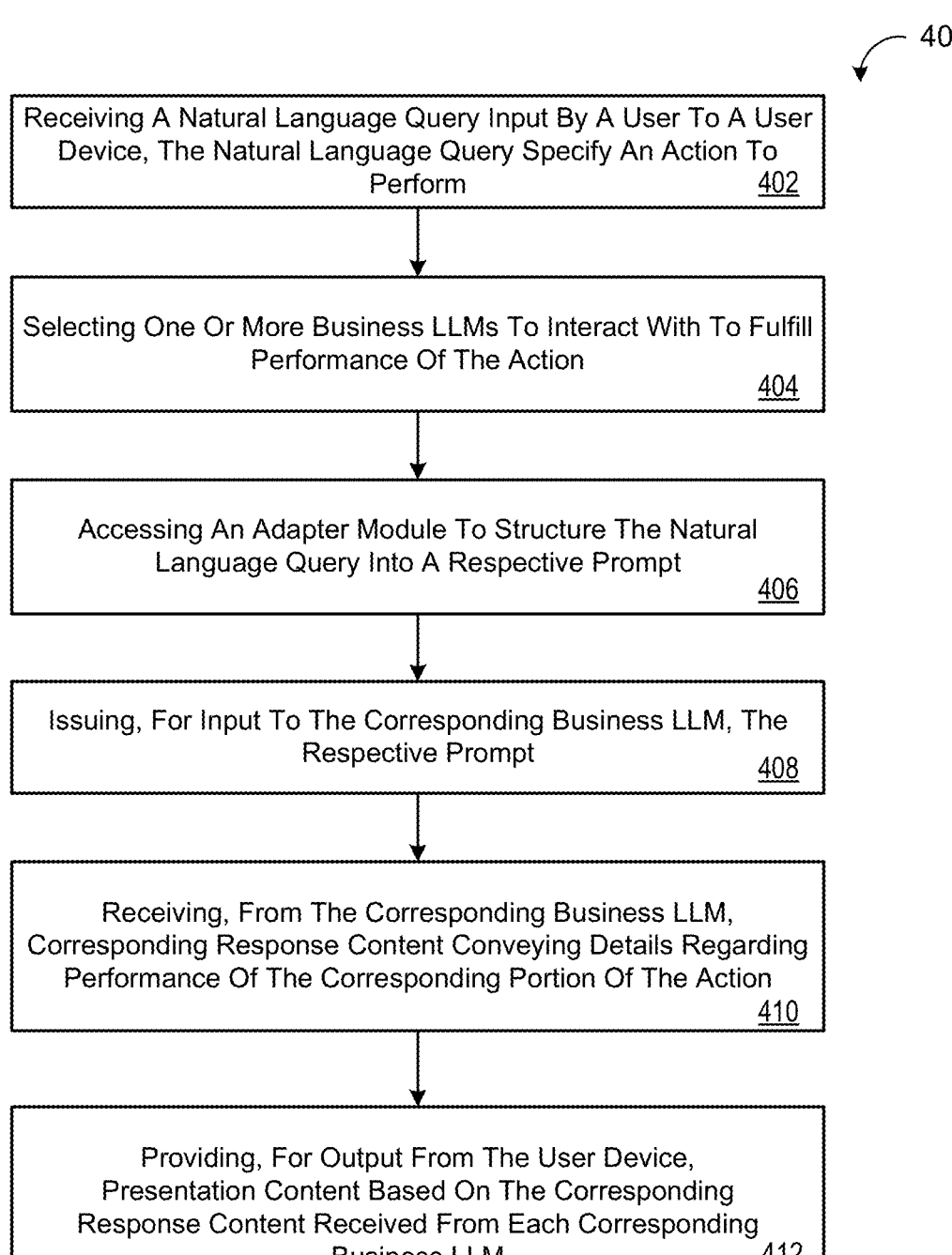

400

Receiving A Natural Language Query Input By A User To A User Device, The Natural Language Query Specify An Action To Perform     402

Selecting One Or More Business LLMs To Interact With To Fulfill Performance Of The Action     404

Accessing An Adapter Module To Structure The Natural Language Query Into A Respective Prompt     406

Issuing, For Input To The Corresponding Business LLM, The Respective Prompt     408

Receiving, From The Corresponding Business LLM, Corresponding Response Content Conveying Details Regarding Performance Of The Corresponding Portion Of The Action     410

Providing, For Output From The User Device, Presentation Content Based On The Corresponding Response Content Received From Each Corresponding Business LLM     412

FIG. 4

SELF-ADJUSTING ASSISTANT LLMS ENABLING ROBUST INTERACTION WITH BUSINESS LLMS

TECHNICAL FIELD

This disclosure relates to self-adjusting assistant large language models (LLMs) enabling robust interaction with business LLMs.

BACKGROUND

Large language models are increasingly used to provide conversational experiences between users and digital assistant interfaces executing on user devices. In general, a user provides a query/prompt to the LLM in natural language that requests information and the LLM generates, based on the query/prompt, a response conveying the requested information. As LLMs are currently opening up a wide range of applications due to their powerful understanding and generation capabilities which can operate over text, image, and/or audio inputs, LLMs are becoming customized to operate and provide specific services for users.

SUMMARY

One aspect of the disclosure provides a computer-implemented method executed on data processing hardware that causes the data processing hardware to perform operations for self-adjusting assistant large language models (LLMs) enabling robust interaction with business LLMs. The operations include receiving, at an assistant interface, a natural language query input by a user to a user device, with the natural language query specifying an action for the assistant interface to perform on behalf of the user. The operations further include selecting, by the assistant interface, one or more business large language models (LLMs) for the assistant interface to interact with to fulfill performance of the action, where each business LLM of the one or more business LLMs is selected to fulfill performance of a corresponding portion of the action. For each corresponding business LLM, among the one or more business LLMs selected by the assistant interface, the operations include: accessing, by the assistant interface, an adapter module to structure the natural language query into a respective prompt specifically formulated for the corresponding business LLM to fulfill performance of the corresponding portion of the action; issuing, by the assistant interface, for input to the corresponding business LLM, where the respective prompt is specifically formulated for the corresponding business LLM to fulfill performance of the corresponding portion of the action; and receiving, at the assistant interface, from the corresponding business LLM, corresponding response content conveying details regarding performance of the corresponding portion of the action. The operations also include providing, for output from the user device, presentation content based on the corresponding response content received from each corresponding business LLM of the selected one or more business LLMs.

Implementations of the disclosure may include one or more of the following optional features. In some implementations, the operations further include, identifying, by the assistant interface, an intermediate list of candidate business LLMs each capable of performing at least a portion of the action. Here, the intermediate list of candidate business LLMs includes a first business LLM and a different second business LLM that are both capable of performing a same respective portion of the action. In these implementations, the operations further include, prompting, by the assistant interface, the user to select which one of the first business LLM or the second business LLM the user prefers for the assistant interface to interact with to fulfill performance of the respective portion of the action; and receiving, at the assistant interface, a selection input indication by the user that indicates selection of the first business LLM for the assistant interface to interact with to fulfill performance of the respective portion of the action. Here, the one or more business LLMs selected by the assistant interface for the assistant interface to interact with to fulfill performance of the action includes the first business LLM and excludes the second business LLM.

In some examples, the operations further include, for output from the user device, selection information associated with the one or more business LLMs selected by the assistant interface. Here, the selection information indicates, for each corresponding business LLM of the one or more business LLMs: a name of the corresponding business LLM; and a description of the corresponding portion of the action the corresponding business LLM will perform on behalf of the user. Additionally, one of the one or more business LLMs selected by the assistant interface for the assistant interface to interact with to fulfill performance of the action may be selected to fulfill performance of at least two different corresponding portions of the action.

In some examples, the operations further include, receiving, at the assistant interface, one or more interoperability configuration inputs, with each interoperability configuration input specifying one or more candidate business LLMs to add to a preferred group of business LLMs for the assistant interface to interact with to fulfill actions on behalf of the user. Here, at least one of the one or more business LLMs selected by the assistant interface for the assistant interface to interact with to fulfill performance of the action are selected by the assistant interface from the preferred group of business LLMs. In these implementations, at least one of the one or more interoperability configuration inputs received from the user may be provided by the user as an unstructured natural language input specifying the one or more candidate business LLMs to add to the preferred group of business LLMs.

In some implementations, accessing the adapter module to structure the natural language query into the respective prompt for one corresponding business LLM among the one or more business LLMs includes converting the natural language query into a respective natural language prompt that permits the assistant interface to communicate with the corresponding business LLM via natural language. Here, the respective natural language prompt includes the respective prompt which is specifically formulated for the corresponding business LLM to fulfill performance of the corresponding portion of the action.

In some examples, accessing the adapter module to structure the natural language query into the respective prompt for one corresponding business LLM among the one or more business LLMs includes converting the natural language query into a respective soft prompt specifically formulated to include a prompt structure advertised by the corresponding business LLM. In some implementations, accessing the adapter module to structure the natural language query into the respective prompt for one corresponding business LLM among the one or more business LLMs includes: accessing the adapter module to view previous prompts issued to the corresponding business LLM, with the previous prompts structured from previous natural language queries; and structuring the natural language query into the respective prompt based on a structure of any of the previous prompts issued to the corresponding business LLM that were deemed successful.

In some examples, for one corresponding business LLM among the one or more corresponding business LLMs selected by the assistant interface, accessing the adapter module includes processing the natural language query using a respective adaptation model associated with the corresponding business LLM to generate the respective prompt specifically formatted for interacting with the corresponding business LLM. Here, the respective adaptation model is trained to structure prompts from natural language input for interacting with the corresponding business LLM. In these examples, the assistant interface may include a personal LLM having an encoder network and a decoder network; and the respective adaptation model associated with the corresponding business LLM may include a prefix to the decoder of the assistant LLM. Additionally, the operations may further include, in response to selecting the at least one corresponding business LLM, activating the respective adaptation model associated with the corresponding business LLM. For another corresponding business LLM among the one or more corresponding business LLMs selected by the assistant interface, accessing the adapter module may include processing the natural language query using another respective adaptation model associated with the other corresponding business LLM to generate the respective prompt specifically formatted for interacting with the other corresponding business LLM. Here, the respective adaptation model associated with the other corresponding business LLM is trained to structure prompts from natural language input for interacting with the corresponding business LLM.

In some implementations, the one or more corresponding business LLMs selected by the assistant interface include a first business LLM and a second business LLM, where the first business LLM is operated by a first cloud provider and the second business LLM is operated by a second cloud provider different than the first cloud provider; and the respective prompt structured from the natural language query for the first business LLM is formatted differently than the respective prompt structured from the natural language query for the second business LLM. In some examples, the operations further include, after providing the presentation content for output from the user device: receiving user feedback indicating user dissatisfaction with the corresponding response content conveying details regarding performance of the corresponding portion of the action fulfilled by a corresponding one of the one or more corresponding business LLMs; determining a loss based on the corresponding response content and the user feedback indicating user dissatisfaction with the corresponding response content; and accessing the adapter module to fine-tune the respective prompt specifically formulated for the corresponding one of the one or more corresponding business LLMs by updating gradients of the respective prompt based on the loss while parameters of the corresponding business LLM remain fixed.

Another aspect of the disclosure provides a system that includes data processing hardware and memory hardware in communication with the data processing hardware and storing instructions that when executed on the data processing hardware causes the data processing hardware to perform operations. The operations include receiving, at an assistant interface, a natural language query input by a user to a user device, the natural language query specifying an action for the assistant interface to perform on behalf of the user. The operations further include selecting, by the assistant interface, one or more business large language models (LLMs) for the assistant interface to interact with to fulfill performance of the action, where each business LLM of the one or more business LLMs is selected to fulfill performance of a corresponding portion of the action. For each corresponding business LLM among the one or more business LLMs selected by the assistant interface the operations include: accessing, by the assistant interface, an adapter module to structure the natural language query into a respective prompt specifically formulated for the corresponding business LLM to fulfill performance of the corresponding portion of the action; issuing, by the assistant interface, for input to the corresponding business LLM, where the respective prompt is specifically formulated for the corresponding business LLM to fulfill performance of the corresponding portion of the action; and receiving, at the assistant interface, from the corresponding business LLM, corresponding response content conveying details regarding performance of the corresponding portion of the action. The operations also include providing, for output from the user device, presentation content based on the corresponding response content received from each corresponding business LLM of the selected one or more business LLMs.

This aspect may include one or more of the following optional features. In some implementations, the operations further include: identifying, by the assistant interface, an intermediate list of candidate business LLMs each capable of performing at least a portion of the action. Here, the intermediate list of candidate business LLMs includes a first business LLM and a different second business LLM that are both capable of performing a same respective portion of the action. In these implementations, the operations further include, prompting, by the assistant interface, the user to select which one of the first business LLM or the second business LLM the user prefers for the assistant interface to interact with to fulfill performance of the respective portion of the action; and receiving, at the assistant interface, a selection input indication by the user that indicates selection of the first business LLM for the assistant interface to interact with to fulfill performance of the respective portion of the action. Here, the one or more business LLMs selected by the assistant interface for the assistant interface to interact with to fulfill performance of the action includes the first business LLM and excludes the second business LLM.

In some examples, the operations further include presenting, for output from the user device, selection information associated with the one or more business LLMs selected by the assistant interface. Here, the selection information indicates, for each corresponding business LLM of the one or more business LLMs: a name of the corresponding business LLM; and a description of the corresponding portion of the action the corresponding business LLM will perform on behalf of the user. Additionally, one of the one or more business LLMs selected by the assistant interface for the assistant interface to interact with to fulfill performance of the action may be selected to fulfill performance of at least two different corresponding portions of the action.

In some examples, the operations further include, receiving, at the assistant interface, one or more interoperability configuration inputs, with each interoperability configuration input specifying one or more candidate business LLMs to add to a preferred group of business LLMs for the assistant interface to interact with to fulfill actions on behalf of the user. Here, at least one of the one or more business LLMs selected by the assistant interface for the assistant interface to interact with to fulfill performance of the action are selected by the assistant interface from the preferred group of business LLMs. In these examples, at least one of the one or more interoperability configuration inputs received from the user may be provided by the user as an unstructured natural language input specifying the one or more candidate business LLMs to add to the preferred group of business LLMs.

In some implementations, accessing the adapter module to structure the natural language query into the respective prompt for one corresponding business LLM among the one or more business LLMs includes converting the natural language query into a respective natural language prompt that permits the assistant interface to communicate with the corresponding business LLM via natural language. Here, the respective natural language prompt comprising the respective prompt which is specifically formulated for the corresponding business LLM to fulfill performance of the corresponding portion of the action.

In some examples, accessing the adapter module to structure the natural language query into the respective prompt for one corresponding business LLM among the one or more business LLMs includes converting the natural language query into a respective soft prompt specifically formulated to include a prompt structure advertised by the corresponding business LLM. In some implementations, accessing the adapter module to structure the natural language query into the respective prompt for one corresponding business LLM among the one or more business LLMs includes: accessing the adapter module to view previous prompts issued to the corresponding business LLM, with the previous prompts structured from previous natural language queries; and structuring the natural language query into the respective prompt based on a structure of any of the previous prompts issued to the corresponding business LLM that were deemed successful.

In some examples, for one corresponding business LLM among the one or more corresponding business LLMs selected by the assistant interface, accessing the adapter module includes processing the natural language query using a respective adaptation model associated with the corresponding business LLM to generate the respective prompt specifically formatted for interacting with the corresponding business LLM. Here, the respective adaptation model is trained to structure prompts from natural language input for interacting with the corresponding business LLM. In these examples, the assistant interface may include a personal LLM having an encoder network and a decoder network; and the respective adaptation model associated with the corresponding business LLM may include a prefix to the decoder of the assistant LLM. In these examples, the operations may further include, in response to selecting the at least one corresponding business LLM, activating the respective adaptation model associated with the corresponding business LLM. In these examples, for another corresponding business LLM among the one or more corresponding business LLMs selected by the assistant interface, accessing the adapter module may include processing the natural language query using another respective adaptation model associated with the other corresponding business LLM to generate the respective prompt specifically formatted for interacting with the other corresponding business LLM. Here, the respective adaptation model associated with the other corresponding business LLM is trained to structure prompts from natural language input for interacting with the corresponding business LLM.

In some implementations, the one or more corresponding business LLMs selected by the assistant interface include a first business LLM and a second business LLM, where the first business LLM is operated by a first cloud provider and the second business LLM is operated by a second cloud provider different than the first cloud provider; and the respective prompt structured from the natural language query for the first business LLM is formatted differently than the respective prompt structured from the natural language query for the second business LLM. In some examples, after providing the presentation content for output from the user device, the operations further include: receiving user feedback indicating user dissatisfaction with the corresponding response content conveying details regarding performance of the corresponding portion of the action fulfilled by a corresponding one of the one or more corresponding business LLMs; determining a loss based on the corresponding response content and the user feedback indicating user dissatisfaction with the corresponding response content; and accessing the adapter module to fine-tune the respective prompt specifically formulated for the corresponding one of the one or more corresponding business LLMs by updating gradients of the respective prompt based on the loss while parameters of the corresponding business LLM remain fixed.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 3 is a schematic view of an example screen displaying selection information 310 for one or more business LLMs selected to fulfill corresponding portions of an action.

FIG. 4 is a flowchart of an example arrangement of operations for adapting an assistant interface to interact with business LLMs to perform actions on behalf of a user.

Like reference symbols in the various drawings indicate like elements.

DETAILED DESCRIPTION

Figure 1:
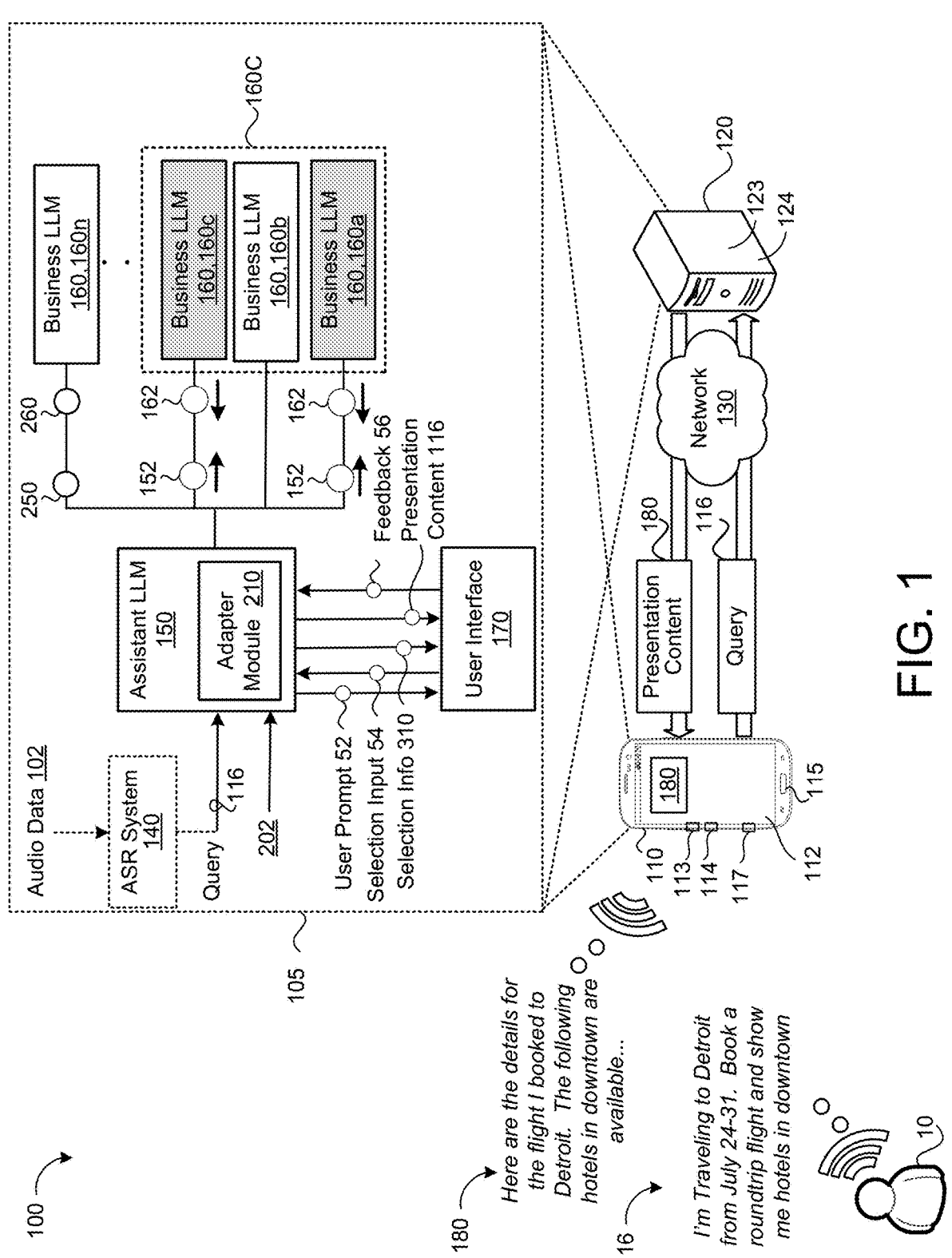
FIG. 1 is a schematic view of an example system for adapting an assistant interface to interact with business large language models (LLMs) to perform actions on behalf of a user.

Humans may engage in human-to-computer dialogs with interactive software applications referred to as "chatbots," "voice bots", "automated assistants", "interactive personal assistants," "intelligent personal assistants," "conversational agents," etc. via a variety of computing devices. As one example, these chatbots may correspond to a machine learning model or a combination of different machine learning models, and may be utilized to perform various tasks on behalf of users.

Chatbots adopting Large language models (LLMs) are currently opening up a wide range of applications due to their powerful understanding and generation capabilities which can operate over text, image, and/or audio inputs.

These models are also being extended with actuation capabilities via integration mechanisms with various service providers.

As LLMs become increasingly common, it is evident that not only users will have their own personalized assistant LLMs, but business entities will develop LLMs as an important mechanism to offer their services to end users in a business to consumer (B2C) setting. In the B2C setting, companies would have their own versions of LLMs backed by different cloud providers. Here, business entities may create and operate their own business LLMs to provide services on the behalf of the business entities. As such, the assistant LLMs will interact with business LLMs to get things done, on behalf of their users.

However, assistant LLMs will not be able to operate all business LLMs in the same manner due to a varying level of capabilities provided across the business LLMs. Implementations herein are directed toward an assistant interface capable of processing a natural language query input by a user specifying a particular action the user wants the assistant interface to perform and the assistant interface interacting with one or more business LLMs to fulfill the particular action by structuring respective prompts from the natural language query for input to the one or more business LLMs. More specifically, after receiving the natural language query input by the user, implementations herein are directed toward the assistant interface selecting the one or more business LLMs for the assistant interface to interact with to fulfill performance of the action, and for each corresponding business LLM among the one or more business LLMs selected by the assistant interface, accessing an adapter module to structure the natural language query into a respective prompt specifically formulated for the corresponding business LLM to fulfill performance of a corresponding portion of the action. Thereafter, the assistant interface issues, for input to each corresponding business LLM, the respective prompt constructed from the natural language query and specifically formulated for the corresponding business LLM to fulfill performance of the corresponding portion of the action. Implementations of the present disclosure also include the assistant interface receiving, from each corresponding business LLM, corresponding response content conveying details regarding performance of the corresponding portion of the action, and providing, for output from a user device, presentation content based on the corresponding response content received from each corresponding business LLM of the selected one or more business LLMs. Described in greater detail below, the selected business LLMs may be selected from a preferred group of business LLMs preconfigured by the user based on interoperability configuration inputs.

FIG. 1 illustrates an example system 100 including an LLM interoperability system 105 for allowing an assistant interface 150 to interact with different business LLMs 160 to perform actions on behalf of a user 10 associated with the assistant interface 150. Generally, the user 10 inputs, via a user device 110, a natural language query 116 to the assistant interface 150 specifying a particular action the user 10 wants the assistant interface 150 to perform on behalf of the user 10, and the assistant interface 150 selects one or more business LLMs 160, 160a-n for the assistant interface 150 to interact with to fulfill performance of the action. Here, the assistant interface 150 may process the natural language query 116 by performing query interpretation to ascertain the particular action to be performed. Fulfillment of the particular action may require performance of multiple portions, or sub-actions/tasks, that collectively define the particular action. As such, the assistant interface 150 may select each business LLM 160 to fulfill performance of a corresponding portion of the action specified by the natural language query 116 input to the assistant interface 150. For each corresponding business LLM 160 selected by the assistant interface 150, the assistant interface 150 issues, for input to the corresponding business LLM 160, a respective prompt 152 specifically formulated for the corresponding business LLM 160 to fulfill performance of the corresponding portion of the action, and receives, from the corresponding business LLM 160, corresponding response content 162 that conveys details regarding performance of the corresponding portion of the action fulfilled by the corresponding business LLM 160. The assistant interface 150 may facilitate, with or without involving input from the user 10, multiple interactions with the corresponding business LLM 160 until the corresponding portion of the action is fulfilled. Based on the corresponding response content 162 received from each corresponding business LLM 160, the assistant interface 150 is configured to provide, for output from the user device 110, presentation content 180. The user device 110 may audibly output, from an audio output device (e.g., acoustic speaker) 117, the presentation content 180 as synthesized speech. Additionally or alternatively, the user device 110 may display, on a screen 112 in communication with the user device 110, graphics, text, and/or other visual information that conveys the details of the presentation content 160.

The system 100 includes the user device 110, a remote computing system 120, and a network 130. The user device 110 includes data processing hardware 113 and memory hardware 114. The user device 110 may include, or be in communication with, an audio capture device 115 (e.g., an array of one or more microphones) for converting utterances of natural language queries 116 spoken by the user 10 into corresponding audio data 102 (e.g., electrical signals or digital data). In lieu of spoken input, the user 10 may input a textual representation of the natural language query 116 via a user interface 150 executing on the user device 110. In scenarios when the user speaks a natural language query 116 captured by the microphone 115 of the user device 110, an automated speech recognition (ASR) system 140 executing on the user device 110 or the remote computing system 120 may process the corresponding audio data 102 to generate a transcription of the query 116. Here, the transcription conveys the natural language query 116 as a textual representation for input to the assistant interface 150. The ASR system 140 may implement any number and/or type(s) of past, current, or future speech recognition systems, models and/or methods including, but not limited to, an end-to-end speech recognition model, such as streaming speech recognition models having recurrent neural network-transducer (RNN-T) model architectures, a hidden Markov model, an acoustic model, a pronunciation model, a language model, and/or a naïve Bayes classifier.

The user device 110 may be any computing device capable of communicating with the remote computing system 120 through the network 130. The user device 110 includes, but is not limited to, desktop computing devices and mobile computing devices, such as laptops, tablets, smart phones, smart speakers/displays, digital assistant devices, smart appliances, internet-of-things (IoT) devices, infotainment systems, vehicle infotainment systems, and wearable computing devices (e.g., headsets, smart glasses, and/or watches).

The remote computing system 120 may be a distributed system (e.g., a cloud computing environment) having scalable elastic resources. The resources include computing resources 123 (e.g., data processing hardware) and/or storage resources 124 (e.g., memory hardware). Additionally or alternatively, the remote computing system 120 may be a centralized system. The network 130 may be wired, wireless, or a combination thereof, and may include private networks and/or public networks, such as the Internet.

With continued reference to FIG. 1, the LLM interoperability system 105 includes the ASR system 140, the assistant LLM 150, a plurality of business LLMs 160, 160*a-n*, and the user interface 170. The ASR system 140 may be optional or only leveraged when the user 10 prefers spoken input of natural language queries 116 as opposed to typed input. In some implementations, the LLM interoperability system 105 executes on both the data processing hardware 113 of the user device 110 and the data processing hardware 123 of the remote computing system 120. For instance, one or more components of the interoperability system 105 may execute on the data processing hardware 113 of the user device 110 while one or more other components of the interoperability system 105 may execute on the remote computing system 120. While not shown, business LLMs 160 may execute on different remote computing systems depending on service providers operating the business LLMs 160. As such, the assistant interface 150 may interact with different business LLMs 160 of the interoperability system 105 that execute across a diverse set of remote computing systems operated by different providers.

A particular business may develop and offer its own version of a business LLM 160 that is backed by a particular cloud service provider. Here, a first business LLM offered by a first business entity may be contracted through a first cloud service provider while a second business LLM offered by a second business entity may be contracted through a second cloud service provider. In this example, the first business LLM may include a first pre-trained LLM (e.g., Google Cloud LLM) customized for the first business entity that includes a far greater number of LLM parameters (e.g., 540 billion parameters) than a number of LLM parameters (e.g., 11 billion parameters) of the second business LLM that includes a second pre-trained LLM (e.g., Ascenty LLM) customized for the second business entity. Here, the first business entity may provide training samples that include training prompts paired with corresponding ground-truth responses to create the first business LLM as a customized version of the first pre-trained LLM. Similarly, the second business entity may provide its own training samples that include training prompts paired with corresponding ground-truth responses to create the second LLM as a customized version of the second pre-trained LLM.

The training, or more specifically, the customization process for creating a business LLM may lead to each business entity having different LLM capabilities. For instance, the customization process may include various levels that serve to customize the resulting business LLM with distinct capabilities. While the number of LLM parameters, available plug-ins, and/or application programming interfaces (APIs) offered by each particular cloud service provider may constrain the LLM capabilities of the resulting business LLM, various training techniques such as fine-tuning, prompt-tuning, and/or reinforcement learning (RL) fine-tuning may provide additional levels of customization of the LLM capabilities offered by the business LLM. For instance, a business entity may use few-shot learning to create a customized version of an existing pre-trained LLM offered by a cloud service provider. On the other hand, prompt-tuning may be implemented to learn how to create soft prompts that guide an existing pre-trained LLM offered by the cloud service provider to provide responses customized for the business entity while parameters of the pre-trained LLM are held fixed. That is, a business entity may fine-tune (e.g., few-shot examples, soft prompts via prompt-tuning, and/or separate adapter weights) inputs external to an existing pre-trained LLM that is already capable of being utilized in conducting more generalized conversations and/or for fine-tuning prompts input to the existing pre-trained LLM without fine-tuning the pre-trained LLM. The present disclosure is not limited to how the business LLMs are created and customized. The present disclosure is concerned with techniques for enabling interoperability between the assistant interface 150 and each multiple different business LLMs 160 that span a diverse set of LLM capabilities.

In some implementations, the assistant interface 150 is an assistant LLM 150 personalized for the user 10. The assistant LLM 150 may function as a personal chat bot capable of having dialog conversations with the user 10 in natural language and performing tasks/actions on the user's behalf. In some examples, the assistant LLM 150 includes an instance of Bard, LaMDA, BERT, Meena, ChatGPT, or any other previously trained LLM. These previously trained LLMs have been previously trained on enormous amounts of diverse data and are capable of engaging in corresponding conversations with users in a natural and intuitive manner. However, these LLMs have a plurality of machine learning (ML) layers and hundreds of millions to hundreds of billions of ML parameters. Accordingly, in implementations where the assistant LLM 150 is an instance of a previously-trained LLM fine-tuned locally at the user device 110, the previously trained LLM that is obtained and fine-tuned to provide the assistant LLM 150 personalized for the user 10 may be a sparsified version of the previously trained LLM. In contrast, in implementations where the assistant LLM is an instance of the previously-trained LLM fine-tuned remotely from the client device, the previously trained LLM that is obtained and fine-tuned to provide the assistant LLM 150 may be a dense version of the previously trained LLM. The sparsified version of the previously trained LLM may have fewer ML layers, fewer ML parameters, masked weights, and/or other sparsified aspects to reduce the size of the previously trained LLM due to various hardware constraints and/or software constraints at the user device 110 compared to the virtually limitless resources of the remote system.

The assistant LLM allows unstructured free-form natural language input that conveys the details of the actions/tasks to be performed, but does not define any corresponding dialog state map (e.g., does not define any dialog states or any dialog state transitions). In response to receiving the query 116 as the unstructured free-form natural language input, the assistant LLM 150 interacts with a business LLM 160 associated with a business entity that is capable of performing an action/task specified by the query 116 by structuring a prompt for input to the business LLM 160 that causes the business LLM 160 to perform the action/task on behalf of the user 10. The business LLM 160 may return response content 162 to the assistant LLM 150 that conveys the details of the action/task performed and the assistant LLM 150 may provide presentation content 180 for output from the user device 10 that serves as a response to the query 116 by conveying information associated with the response content 162 returned from one or more business LLMs 160. The assistant LLM 150 may determine the presentation content 180 based on the response content 162 returned provided by each business LLM 160 that performed a corresponding portion of the action on behalf of the user 10.

Further, the presentation content 180 may include, for example, a corresponding result of one or more tasks performed by business LLMs, a corresponding summary of the corresponding tasks, and/or other content. Continuing with the above example, the assistant LLM 150 may also perform actions, or portions of actions, on behalf of the user 10 without the need to interact with any business LLMs 160.

In other implementations, the assistant interface 150 includes a conventional virtual digital assistant that does not utilize LLM functionality but may use heuristics/rules to interoperate with business LLMs for performing actions on behalf of the user 10. For simplicity, the present disclosure will refer to the assistant interface 150 as an assistant LLM 150, however the assistant interface 150 of the present disclosure may include a conventional virtual digital assistant.

The business LLMs 160 available for the assistant LLM 150 to interact with for performing actions on behalf of the user 10 may be pre-configured based on interoperability configurations inputs 202 received by the assistant LLM 150. Each interoperability configuration input 202 may specify one or more candidate business LLMs to add to a preferred group of business LLMs for the assistant LLM 150 to interact with to fulfill actions on behalf of the user 10. Here, the interoperability configuration inputs 202 may cause the assistant LLM 150 to send an interoperability request 250 to a business LLM 160 requesting the business LLM 160 to interact with the assistant LLM 150. The business LLM 160, or entity associated therewith, may return an adaptation pack 260 to the assistant LLM 150 that provides details for the assistant LLM 150 to best adapt when interoperating with the business LLM 160 to most effectively achieve the intent of the user 10. The assistant LLM 150 may include, or communicate with, an adapter module 210 that receives the adaptation packs 260 for use in configuring the assistant LLM 150 to adapt for interoperating with each business LLM 160.

Figure 2:
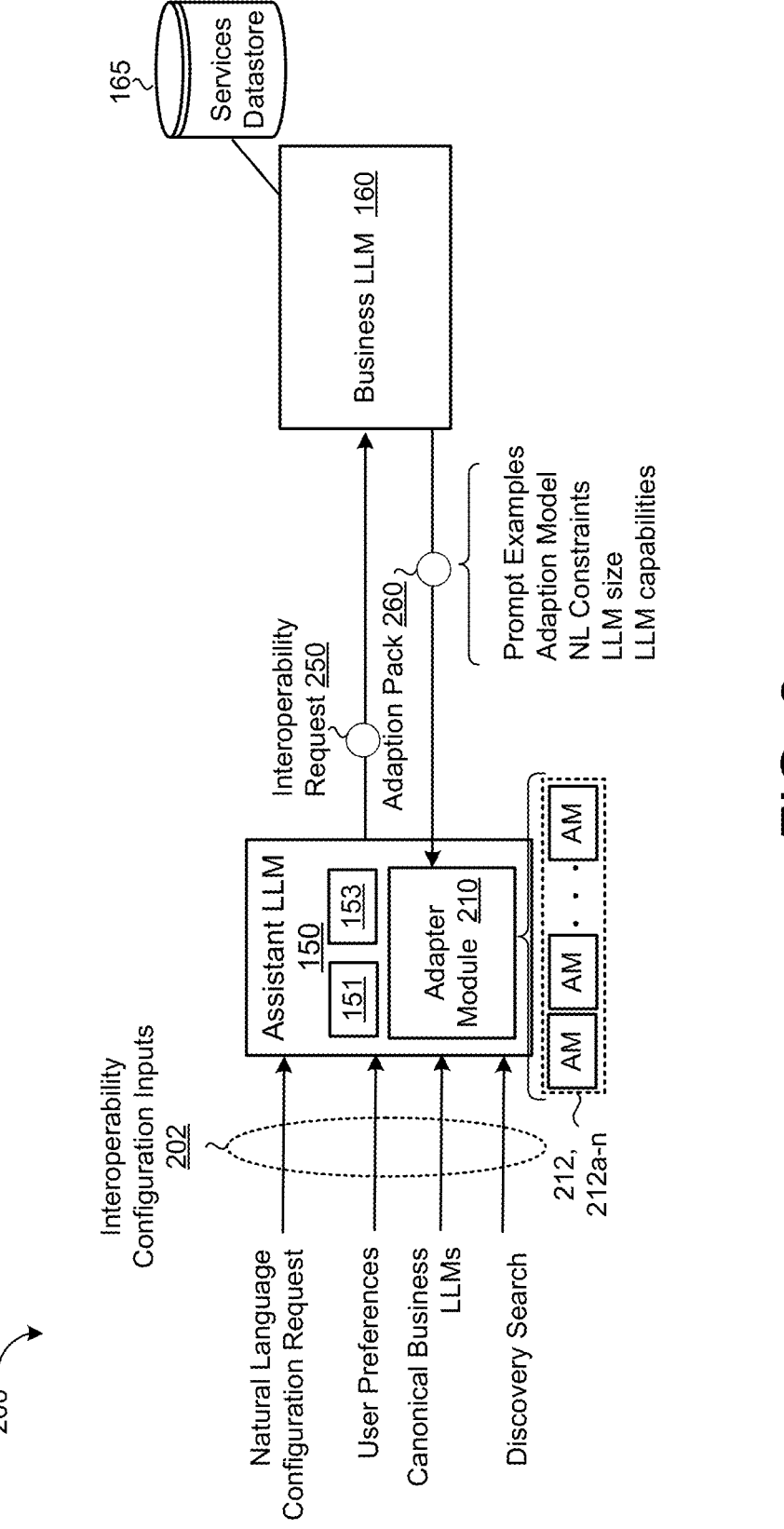
FIG. 2 is a schematic view of an example process for configuring the assistant interface to interoperate with a business LLM.

FIG. 2 shows a schematic view 200 of an example configuration process performed by the assistant LLM 150 for configuring the assistant LLM 150 for interoperability with an example business LLM 160. The assistant LLM 150 may perform the configuration process for each business LLM 160 the assistant LLM 150 wants to interoperate with. In some examples, the interoperability configuration input 202 received by the assistant LLM 150 includes a natural language configuration request input by the user 10 that explicitly specifies one or more candidate business LLMs 160 to add to a preferred group of business LLMs. For instance, the natural language configuration request may state, "I'd like to order from eat.ch most of my dishes, except Indian ones for which I'd like to use smood.ch." Here, the assistant LLM 150 may be configured to translate the natural language configuration request into a configuration by sending configuration requests 250 to respective business LLMs 160 offered by eat.ch and smood.ch, whereby the business LLMs 160 may return respective adaptation packs 260.

In some additional examples, an interoperability configuration input 202 received by the assistant LLM 150 includes user preferences that may indicate services the user 10 prefers to use, services used by the user ascertained from user history, user feedback, and/or applications installed on the user device. For instance, the assistant LLM 150 may learn that the user 10 always books flights on Delta Airlines and collects reward points for Delta Airlines via a dedicated credit card. Moreover, an interoperability configuration input 202 may indicate a discovery search from the user 10 that requests the assistant LLM 150 to search for business LLMs having service capabilities specified by the discovery search. Here, the business LLM 160 may have memory-augmentation with an external datastore of services 165 that the user 10 may query or search by feeding a discovery prompt to the assistant LLM 150.

In some additional examples, an interoperability configuration input 202 indicates canonical business LLMs 160 associated with business LLMs 160 that are popular across a population of users for performing common tasks. A canonical business LLM 160 may be input to the preferred group of candidate business LLMs 160 for the assistant LLM 150 automatically if the canonical business LLM 160 is associated with a business entity already authorized by the user. If the user 10 has not already authorized the business entity associated with a canonical business LLM 160 specified in the configuration input 202, the assistant LLM 150 may suggest the canonical business LLM 160 for inclusion in the preferred group of candidate business LLMs 160, whereby the user 10 may explicitly select the canonical business LLMs 160 for inclusion in the preferred group via a checkbox displayed by the user interface 170. By the same notion, the user 10 may remove any business LLM 150 from the preferred group of candidate business LLMs 160 at any time, e.g., by unselecting an associated checkbox displayed by the user interface 170 for the business LLM the user 10 wants to remove. The canonical business LLMs 160 deemed available may depend on a geographical region the user 10 is located. For instance, a business LLM offered by a food delivery service that only operates in the United States would not be available for a user 10 residing in the United Kingdom.

With continued reference to FIG. 2, the adaptation pack 260 returned from the business LLM 160 may showcase the LLM capabilities of the business LLM 160 to inform the assistant LLM 150 how to best adapt for when interoperating with the business LLM 150. The adaptation pack 260 may include an adaptation model 212, prompt examples, natural language constraints, a size of the business LLM (e.g., number of parameters), and/or capabilities of the LLM. The adaptation model 212 may be published by the business LLM 160 and be specific to the business LLM 150 for use by the assistant LLM 150 for generating prompts specifically formatted for interacting with the corresponding business LLM. Here, an entity associated with the business LLM 150 may train the respective adaptation model 212 to structure prompts from natural language for interacting with the business LLM 160. In some examples, the adapter module 210 stores a plurality of adaptation models 212, 212a-n each associated with a respective business LLM 160 the assistant LLM 150 is configured to interoperate with. In these examples, and described in greater detail below, the assistant LLM 150 may activate the respective adaptation model 212 associated with each business LLM 160 the assistant LLM 150 has selected to interoperate with to fulfill an action on behalf of the user 10. An adaptation model 212 previously trained by the business entity may be fine-tuned by the assistant LLM 150 based on positive/negative interactions from the user regarding response content returned from the business LLM from previous prompts structured from the adaptation model 212. In some implementations, the assistant LLM 150 includes an encoder network 151 and a decoder network 153. The encoder network 151 is configured to encode the natural language query 116 into an encoded representation and the decoder network 153 is configured to decode the encoded representation into a resulting prompt specifically formatted for a particular business LLM to fulfill performance of a corresponding portion of an action specified by the natural language query 116. In these implementations, the adapter module 210 may activate the respective adaptation model 212 associated with a corresponding business LLM such that the activated adaptation model 212 includes a prefix to the decoder network 153 of the assistant LLM 150. The adaptation model 212 may serve as a sub-model to the assistant LLM 150, whereby the adaptation model 212 biases how prompts for interacting with the corresponding business LLM 160 are structured.

In some scenarios, the adapter module 210 uses prompt examples included in an adaptation pack 260 that convey a prompt structure advertised by the business LLM. Here, the adapter module 210 may use the prompt examples to adapt the assistant LLM 150 to convert a natural language query 116 input to the assistant LLM into a respective soft prompt specifically formulated to include the prompt structure conveyed by the prompt examples. A soft prompt may include a numerical representation (e.g., vector) that may be provided as input to the business LLM instead of a natural language prompt. The prompt examples included in the adaptation pack 260 may include few-shot examples operative to fine-tune the business LLM 160 to perform specific tasks or provide response content 162 within a particular domain.

The adapter module 210 may additionally or alternatively use natural language constraints included in an adaptation pack 260 for paraphrasing natural language queries 116 into a format suitable for prompting the business LLM 160. Here, the natural language constraints provide constraints on how the assistant LLM 150 and the business LLM 160 communicate via natural language. As such, the natural language constraints may permit the adaptor module 210 to convert a natural language query into a respective natural language prompt that permits the assistant LLM 150 to communicate with the corresponding business LLM 160 via natural language. For instance, the business LLM 160 may require that the natural language prompt include terms spelled a certain way or content has to be narrowed from what was included in the original natural language query 116. In some examples, the assistant LLM 150 and/or adapter module 210 uses the natural language constraints to generate a template for converting natural language queries input by the user to the assistant LLM 150 into natural language prompts specifically formatted for the business LLM 160.

The adapter module 210 may receive the adaptation pack 260 for use in configuring the assistant LLM 150 for interacting with the business LLM 160. Notably, the adapter module 210 configures the assistant LLM 160 to convert natural language queries input to the assistant LLM 160 into corresponding prompts specifically formatted for the business LLM 150 to fulfill performance of corresponding portions of action specified by the natural language queries. Based on the rational that the business LLMs 160 include a vast and diverse set of LLM capabilities and are provided by multiple different cloud service providers, the assistant LLM 150 must access the adapter module 210 to ascertain how to interoperate with each business LLM 160 on a case by case basis. For instance, for two different business LLMs 150 each capable of booking flights, a prompt generated by the assistant LLM 150 for invoking one of the business LLMs for booking a flight may not be suitable for invoking the other business LLM to book the same flight. Stated differently, the assistant LLM 150 accesses the adapter module 210 for adapting the assistant LLM 150 to structure prompts specific to the business LLM the assistant LLM 150 is interoperating with at a given instance.

In the example of FIG. 1, the assistant LLM 150 receives the natural language query 116 input by the user (e.g., via speech captured by the microphone of the user device 10 or via text input via the user interface 170 executing on the user device 110) that states, "I'm traveling to Detroit from July 24-31. Book a roundtrip flight and show me hotels in downtown." Here, the query 116 specifies the action of booking a roundtrip flight and returning available hotels in downtown Detroit. The assistant LLM 150 processes the natural language query 116 to identify an intermediate list of candidate business LLMs 160 that are each capable of performing at least a portion of the action. The assistant LLM 150 may further resolve ambiguous details not explicitly stated in the natural language query 116 that are required to perform the action. In the example, the assistant LLM 150 may determine that the departing flight should depart from Dallas and the return flight should arrive in Dallas based on knowledge that the user 10 lives near Dallas. In the example shown, the intermediate list of candidate business LLMs 160 includes a first business LLM 160a associated with an airline booking business entity and capable of booking/reserving flights but not hotels, a second business LLM 160b associated with a travel agency business entity and capable of booking/reserving flights and hotels simultaneously, and a third business LLM 160c associated with a lodging business entity and capable of booking/reserving hotels without capabilities to interact with flying providers. Notably, in this example, the first business LLM 160a and the different second business LLM 160b are both capable of performing a same respective portion of the action that booking/reserving flights. Here, the assistant LLM 150 may issue a user prompt 52 prompting the user 10 to select which one of the first business LLM 160a or the second business LLM 160b the user 10 prefers for the assistant LLM 150 to interact with to fulfill performance of the respective portion of the action (i.e., book the roundtrip flight to Detroit). The assistant interface 170 may present the user prompt 52 audibly or visually from the user device 10 and the user may provide a selection input indication 54 via the user interface 170 that indicates selection of the first business LLM 160a for the assistant LLM to interact. The user 10 may provide the selection input indication 54 to the assistant interface 170 via speech, touching, gesture, or other input means. In lieu of prompting the user 10 via the user prompt 52, the assistant LLM 150 may refer to past interactions where the user 10 provided feedback 56 that indicated the user 10 preferred to use the first business LLM 160a over the second business LLM0 160b for booking flights. Here, a confidence of the first business LLM 160a may be boosted and the assistant LLM 150 may select the first business LLM 160a without involving additional input from the user 10.

The assistant LLM 150 may consider how rich and detailed the natural language query 116 is when identifying which business LLMs are capable of performing at least a portion of an action specified by a natural language query 116. For instance, a smaller business LLM (e.g., about 11 billion parameters) may only be able to handle structured queries whereas a larger business LLM may be able to handle queries with richer language or knowledge base.

Continuing with the example, the assistant LLM 150 selects one or more business LLMs 160 to interact with to fulfill performance of the action, wherein each business LLM 160 of the one or more business LLMs is selected to fulfill performance of a corresponding portion of the action. Here, the first business LLM 160a and the third business LLM 160c are shaded in FIG. 1 to depict that the first and second business LLMs 160a, 160c are selected. The first business LLM 160a may be selected based on the user input indication 54 selecting the first business LLM 160a, thereby resulting in the second business LLM 160b to be excluded from the selected one or more business LLMs 160. Notably, the third business LLM 160c may be selected automatically for performing the corresponding portion of the action for showing available hotels when the assistant LLM 150 is confident in selecting the third business LLM 160c. For instance, the assistant LLM 150 may assign confidence scores for selecting business LLMs 160c based on user preferences, past user interactions/feedback, richness/detail of underlying natural language query, and/or LLM capabilities of the business LLM. In this example, an interoperability configuration input 202 may have indicated that the user only wants to stay in hotels affiliated with Hotel Group. Optionally, the assistant LLM 150 may still provide a notification via the user interface 170 that informs that user 10 that the third business LLM 160c has been selected.

Referring to FIGS. 1 and 3, in some implementations, the assistant LLM 150 presents, for output from the user device, selection information associated with the one or more business LLMs. For each corresponding business LLM, the selection information may indicate a name of the corresponding business LLM and a description of the corresponding portion of the action the corresponding business LLM will perform on behalf of the user 10. For instance, continuing with the example where the first business LLM 160a is selected for booking the roundtrip flight and the third business LLM 160c is selected for showing available hotels in downtown Detroit, the selection information 310 may include both the name 310a of the first business LLM 160a (i.e., Flight LLM affiliated with ABC Airlines) and the description 310b of the portion of the action the first business LLM 160a will perform (i.e., Booking a roundtrip flight from Dallas to Detroit). Similarly, the selection information 310 may include the name 310a of the third business LLM 160c (i.e., Hotel LLM affiliated with 123 Hotel Group) and the description 310b of the portion of the action the third business LLM 160c will perform (i.e., Showing available hotels in downtown Detroit from July 24-31). The user interface 170 may permit the user to confirm the selected assistant LLMs 150 or override the selection of any business LLM. While not shown, one business LLM 160 may be selected to fulfill performance of at least two different corresponding portions of an action.

Referring back to FIG. 1, for each corresponding business LLM 160 among the one or more business LLMs 160 selected by the assistant LLM 150, the assistant LLM 150 may access the adapter module 210 to structure the natural language query 116 into a respective prompt 152 specifically formulated for the corresponding business LLM 160 to fulfill performance of the corresponding portion of the action. In one example, the adapter module 210 has knowledge to feed natural language prompts to the first business LLM 160a based on the natural language constraints and/or prompt examples included in the adaptation pack 260 (FIG. 2) provided from the first business LLM 160a when configuring the first business LLM 160a for interoperability with the assistant LLM 150. Accordingly, the assistant LLM 150 may access the adapter module 210 to convert the natural language query 116 into a respective natural language prompt 152 to cause the first business LLM 160a to fulfill performance of the corresponding portion of the action. In this example, the adapter module 210 has knowledge to feed soft prompts to the third business LLM 160c based on the prompt examples included in the adaptation pack 260 provided from the third business LLM 160c.

Accordingly, the assistant LLM 150 may access the adapter module 210 to convert the natural language query 116 into a respective soft prompt 152 specifically formulated to include a prompt structure advertised by the third business LLM 160c. The soft prompt 152 may include a numerical representation (e.g., vectors) to provide as input to the third business LLM 160c.

In some implementations, for at least one corresponding business LLM 160 among the one or more corresponding business LLMs selected by the assistant LLM 150, the adapter module 210 activates a respective adaptation model 212 associated with the corresponding business LLM to generate a respective prompt 152 specifically formatted for interacting with the corresponding business LLM 160. The assistant LLM 150 may activate the respective adaptation model 212 in response to selecting the corresponding business LLM 160. As previously described above, the respective adaptation model 212 may be trained to structure prompts from natural language input for interacting with the corresponding business LLM 160. In these implementations, when the assistant LLM 150 includes the encoder network 151 and the decoder network 153, the respective adaptation model 212 associated with the corresponding business LLM 160 may include a prefix to the decoder network 153. For another corresponding business LLM of the one or more corresponding business LLMs selected, the adapter module 210 may further activate another respective adaptation model associated with the other corresponding business LLM to generate the respective prompt specifically formatted for interacting with the other corresponding business LLM. Here, the respective adaptation model 212 associated with the other corresponding business LLM 160 may be trained to structure prompts from natural language input for interacting with the corresponding business LLM.

In some additional implementations, the assistant LLM 150 accesses the adapter module 210 to view previous prompts issued to a corresponding business LLM 160. Here, the previous prompts are structured from previous natural language queries 116. Based on the previous prompts, the assistant LLM 150 may structure the natural language query 116 into a respective prompt based on a structure of any of the previous prompts issued to the corresponding business LLM that were deemed successful.

With continued reference to FIG. 1, for each corresponding business LLM 160 among the one or more business LLMs 160 selected by the assistant LLM 150, the assistant LLM 150 may issue, for input to the corresponding business LLM, the respective prompt 152 specifically formulated for the corresponding business LLM 160 to fulfill performance of the corresponding portion of the action. Continuing with the example, the assistant LLM 150 may issue a first prompt specifically formulated for the first business LLM 160a to cause the first business LLM 160a to book the roundtrip flight to Detroit, while the assistant LLM 150 may issue a second prompt 152 specifically formulated for the third business LLM 160c to cause the third business LLM 160c to provide available hotels in downtown Detroit. The first prompt 152 issued to the first business LLM 160a may be formatted/structured differently than the second prompt 152 issued to the third business LLM 160c.

After issuing the respective prompt 152 to each corresponding business LLM 160 among the one or more business LLMs 160 selected by the assistant LLM 150, the assistant LLM 150 receives, from each corresponding business LLM 160, corresponding response content 162 conveying details regarding performance of the corresponding portion of the action. Continuing with the example, the assistant LLM 150 issues the respective prompts 152 to the first business LLM 160*a*, for performing the corresponding portion of the action that includes booking the roundtrip flight to Detroit, and to the third business LLM 160*c*, for performing the corresponding portion of the action that includes retrieving available hotels in downtown Detroit. The details may indicate that the corresponding portion of the action was or was not fulfilled. In some examples, the assistant LLM 150 and at least one of the corresponding business LLMs 160 undertake multiple interactions of issuing respective prompts 152 and returning corresponding response content 162 there between until the corresponding portion of the action is fulfilled.

Based on the corresponding response content 162 received from each corresponding business LLM of the selected one or more business LLMs, the assistant LLM 150 uses the user interface 170 to provide, for output from the user device 110, presentation content 180 for the user 10 that serves as a response to the natural language query 116 initially input by the user 10 to the assistant LLM 150. The assistant LLM 150 may generate the presentation content 180 based on all the response content 162 received. In some scenarios, the assistant LLM 150 refines or filters the response content 162 to provide presentation content 180 personalized for the user 10. In these scenarios, the assistant LLM 150 may have knowledge of user preferences or past interactions between the user 10 and the assistant LLM 150. For instance, the assistant LLM 150 may filter the response content 162 received from the third business LLM 160*c* so that only hotels offering a free complimentary continental breakfast are presented to the user 10 in presentation content. Moreover, the assistant LLM 150 may prompt the user 10 at any time to disambiguate between two or more options related to an action to be performed. For instance, while the user 10 was clear in the natural language query 116 that the user 10 wants the assistant LLM 150 to book a roundtrip flight to Detroit for a trip from July 24-31, the assistant LLM 150 may issue a user prompt to ascertain whether the user 10 would like to depart for Detroit on the evening of July 23 to assure that the user 10 is present in Detroit for any obligations the user 10 may have on July 24. Assuming that the user 10 responds to the prompt 52 affirmatively, the assistant LLM 150 may create and issue a respective prompt 152 to the first business LLM 160*c* to cause the first business LLM 160*c* to book/reserve a flight that departs from Dallas to Detroit in the evening of July 23. Moreover, the affirmative response by the user 10 indicating that the user 10 wants to arrive in Detroit on July 23 and not July 24, causes the assistant LLM 150 to refine the respective prompt 152 structured for the third business LLM 160*c* so that the respective prompt 152 instructs the third business LLM 160*c* to retrieve hotels that are available in downtown Detroit from July 23 (instead of July 24) to July 31.

The user interface 170 may audibly output the presentation content 180 as a synthesized speech representation conveying the details of the action performed responsive to the natural language query 116. Here, the user interface 170 may access a text-to-speech (TTS) system (not shown) that converts a textual representation of the presentation content 180 output from the assistant LLM 150 into a synthesized speech representation. The TTS system is non-limiting and may include a TTS model and vocoder. Continuing with the example, the user interface 170 may provide the synthesized speech representation of the presentation content 180 for audible output from an acoustic speaker 117 of the user device 10 that includes, "Here are the details for the flight I booked to Detroit. The following hotels in downtown are available during your stay." Additionally or alternatively, the assistant LLM 150 may provide visual or graphical representations of the presentation content 180 for output from the user device 10 by displaying text and or graphics on the screen 112 of the user device 112. In some examples, the visual or graphical representations of the presentation content 180 are provided for output to supplement the synthesized speech representation of the presentation content 180. For instance, the user interface 170 may graphically display the flight details for each of the departing and returning flights booked by the first business LLM 160, whereby the user 10 may select the graphic to ascertain richer details about the departing and returning flights. Additionally, the user interface 170 may graphically display a list of all the hotels that are available in downtown, whereby the user 10 may interact with a graphical representation of each available hotel 10 to view accommodations offered, location, pricing, etc. The user 10 may then affirmatively select (e.g., by selecting a graphical element) which hotel in the list of available hotels the user 10 would like the assistant LLM 150 to reserve on behalf of the user 10. The assistant LLM 150 may proceed by constructing a new prompt to issue to the third business LLM 160*c* that instructs the third business LLM 160*c* to book/reserve the hotel selected by the user 10.

After providing the presentation content 180, the assistant LLM 150 may determine whether or not fulfillment of the action was successful based on user feedback 56. In some examples, the assistant LLM 150 receives user feedback 56 indicating that the user 10 performs actions unrelated to the previously input natural language query 116. Here, the assistant LLM 150 can make the inference that the user 10 is satisfied with the presentation content 180 and label the interaction between the assistant LLM 150 and each of the one or more corresponding business LLMs selected to perform the corresponding portions of the action as being successful. In some examples, the assistant LLM 150 stores each successful interaction instance as a positive example that includes any combination of the natural language query 116 that was input to the assistant LLM 150, the business LLMs selected to fulfill the corresponding portions of the action, the respective prompts 152 created and issued to the business LLMs, the respective response content 162, and the presentation content 180.

In other examples, the assistant LLM 150 receives user feedback 56 indicating a correction to the presentation content 180 or a follow-up query to perform an additional action related to the original action specified in the initial natural language query 116. For instance, the user 10 may follow-up with another natural language query stating, "Book dinner for the first night I arrive there", which will cause the assistant LLM 150 to interact with additional business LLMs to reserve dinner and also store the initial interaction as a successful interaction instance. On the other hand, user feedback 56 indicating the correction to the presentation content 180 may serve to negate the previous action and result in the assistant LLM 150 labeling the previous interaction between the assistant LLM 150 and each of the one or more corresponding business LLMs selected to perform the corresponding portions of the action as being unsuccessful. As an example, the user 10 may provide feedback 56 stating "This is not suiting my plans, please redo this booking with new provider Y". In some examples, the assistant LLM 150 stores each unsuccessful interaction instance as a negative example that includes any combination of the natural language query 116 that was input to the assistant LLM 150, the business LLMs selected to fulfill the corresponding portions of the action, the respective prompts 152 created and issued to the business LLMs, the respective response content 162, and the presentation content 180.

In some implementations, the assistant LLM 150 uses the stored positive examples associated with successful interactions between the assistant LLM 150 and corresponding business LLMs 160 to further refine future interactions between the assistant LLM 150 and the corresponding business LLMs 160 to fulfill the same or similar actions more efficiently in the future. In these implementations, a business LLM 160 involved in one of the interactions with the assistant LLM 150 may offer a training mode where the respective adaptation model 212 associated with the business LLM 160 can be tuned or respective prompts 152 generated by using the respective adaptation model 212 for input to the business LLM 160 are prompt-tuned in a manner that reduces, or at least better tailors, the interactions between the assistant LLM 150 the business LLM 160.

In a more heuristic approach, the assistant LLM 150 may identify stored positive examples associated with natural language queries 116 that are similar a current natural language query 116 input to the assistant LLM 150, whereby the stored positive examples may assist the assistant LLM 150 in selecting business LLMs that were previously successful as well as permitting the assistant LLM 150 to structure prompts 152 similarly to those used in the identified stored positive examples.

In some additional implementations, the assistant LLM 150 uses the stored negative examples associated with unsuccessful interactions between the assistant LLM 150 and corresponding business LLMs 160 to refine the selection process for how the assistant LLM 150 selects business LLMs 160 and/or how the assistant LLM 150 creates and issues prompts 152 to the business LLMs 160. For instance, the negative example ascertained from the user feedback 56 may indicate one of the business LLMs selected to fulfill a corresponding portion of an action was not suitable. Further, the negative example may indicate that a respective prompt 152 structured from the natural language query 116 was incorrect and resulted in one of the business LLMs 160 unable to successfully fulfill performance of the corresponding portion of the action.

Notably, the assistant LLM 150 may use the stored positive and negative examples to fine-tune the assistant LLM 150 and/or prompt-tune respective prompts issued to business LLMs 160 via reinforcement learning from human feedback (RLHF). Here, interactions between the assistant LLM 150 and the business LLMs 160 can be improved via reinforcement learning (RL) optimization techniques. For interactions between the assistant LLM 150 and a particular business LLM 160, RLHF may optimize how the assistant LLM 150 interacts with the particular business LLM 160 in the future where parameters of the assistant LLM 150 are tuned while parameters of the business LLM 160 are held fixed. By the same notion, parameters of a respective adaptation model 212 associated with the particular business LLM 160 may be tuned/updated to guide the adaptation model 212 in learning to structure prompts issued to the particular business LLM 160 that result in response content 162 more tailored for the user 10.

After providing the presentation content 180, the assistant LLM 150 may receive user feedback 56 indicating user dissatisfaction with the corresponding response content 162 returned by a corresponding one of the one or more corresponding business LLMs 160. Here, the interaction with the assistant LLM 150 and the corresponding business LLM 160 may be stored as a negative example, whereby the assistant LLM 160 may determine a loss based on the corresponding response content 162 and the user feedback 56 indicating user dissatisfaction with the corresponding response content 162. In some examples, the assistant LLM 150 applies RLHF by accessing the adapter module 210 to fine-tune the respective prompt 152 (and/or the respective adaptation model 212 if available) specifically formulated for the corresponding business LLM 160 by updating gradients of the respective prompt based on the loss while parameters of the corresponding business LLM remain fixed.

Figure 5:
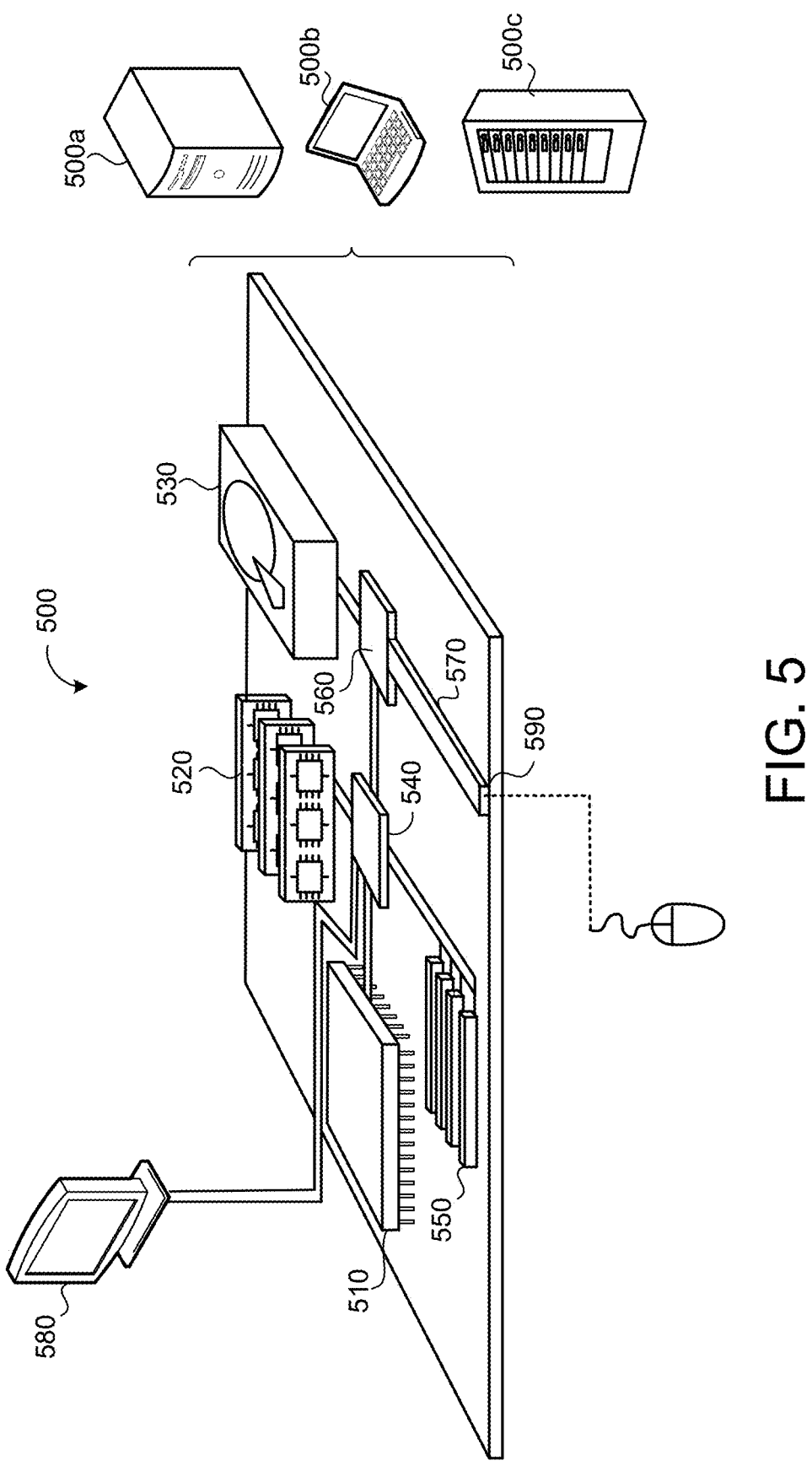
FIG. 5 is a schematic view of an example computing device that may be used to implement the systems and methods described herein.

FIG. 4 is a flowchart of an example arrangement of operations for a method 400 of adapting an assistant LLM 150 to interact with business LLMs 160 to fulfill performance of an action on behalf of a user 10 associated with the assistant LLM 150. The method 400 may execute on data processing hardware 510 (FIG. 5) based on instructions stored on memory hardware 520 (FIG. 5). In some examples, the data processing hardware 510 includes the data processing hardware 113 of the user device 110 and the memory hardware 520 includes the memory hardware 114 of the user device 110. In other examples, the data processing hardware 510 includes the data processing hardware 123 of the remote computing system 120 and the memory hardware 520 includes the data processing hardware 124 of the remote computing system 120. At operation 402, the method 400 includes receiving, at an assistant interface, a natural language query input by a user to a user device. The natural language query specifies an action for the assistant interface to perform on behalf of the user.

At operation 404, the method 400 includes selecting, by the assistant interface, one or more business large language models (LLMs) for the assistant interface to interact with to fulfill performance of the action. Here, each business LLM of the one or more business LLMs selected to fulfill performance of a corresponding portion of the action.

For each corresponding business LLM among the one or more business LLMs selected by the assistant interface, operations 406, 408, 410 are performed. At operation 406, the method 400 includes accessing, by the assistant interface, an adapter module to structure the natural language query into a respective prompt specifically formulated for the corresponding business LLM to fulfill performance of the corresponding portion of the action. At operation 408, the method 400 includes issuing, by the assistant interface, for input to the corresponding business LLM, the respective prompt specifically formulated for the corresponding business LLM to fulfill performance of the corresponding portion of the action. At operation 410, the method 400 includes receiving, at the assistant interface, from the corresponding business LLM, corresponding response content conveying details regarding performance of the corresponding portion of the action. At operation 412, the method 400 includes providing, for output from the user device, presentation content based on the corresponding response content received from each corresponding business LLM of the selected one or more business LLMs.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executing on data processing hardware that causes the data processing hardware to perform operations comprising:
receiving, at an assistant interface, a natural language query input by a user to a user device, the natural language query specifying an action for the assistant interface to perform on behalf of the user;
selecting, by the assistant interface, two business large language models (LLMs) for the assistant interface to interact with to fulfill performance of the action, each business LLM of the two business LLMs:
selected to fulfill performance of a corresponding portion of the action; and associated with a different respective adaptation model, the adaptation model published by the corresponding business LLM for use by the assistant interface to structure the natural language query into a different respective prompt specifically formulated for the corresponding business LLM to fulfill performance of the corresponding portion of the action;
for each corresponding business LLM among the two business LLMs selected by the assistant interface:
activating, by the assistant interface, the different respective adaptation model published by the corresponding business LLM;
processing, by the assistant interface, using the activated different respective adaptation model, the natural language query to generate the different respective prompt specifically formulated for the corresponding business LLM to fulfill performance of the corresponding portion of the action;
issuing, by the assistant interface, for input to the corresponding business LLM, the respective prompt specifically formulated for the corresponding business LLM to fulfill performance of the corresponding portion of the action while the assistant interface issues, for input to the other business LLM among the two business LLMs selected by the assistant interface, the other different respective prompt specifically formulated for the other business LLM to fulfill performance of the portion of the action corresponding to the other business LLM; and
receiving, at the assistant interface, from the corresponding business LLM, corresponding response content conveying details regarding performance of the corresponding portion of the action; and
providing, for output from the user device, presentation content based on the corresponding response content received from each corresponding business LLM of the selected two business LLMs.

2. The computer-implemented method of claim 1, wherein the operations further comprise presenting, for output from the user device, selection information associated with the two business LLMs selected by the assistant interface, the selection information indicating, for each corresponding business LLM of the two business LLMs:
a name of the corresponding business LLM; and
a description of the corresponding portion of the action the corresponding business LLM will perform on behalf of the user.

3. The computer-implemented method of claim 1, wherein one of the two business LLMs selected by the assistant interface for the assistant interface to interact with to fulfill performance of the action is selected to fulfill performance of at least two different corresponding portions of the action.

4. The computer-implemented method of claim 1, wherein the operations further comprise:
receiving, at the assistant interface, one or more interoperability configuration inputs, each interoperability configuration input specifying one or more candidate business LLMs to add to a preferred group of business LLMs for the assistant interface to interact with to fulfill actions on behalf of the user,
wherein at least one of the two business LLMs selected by the assistant interface for the assistant interface to interact with to fulfill performance of the action are selected by the assistant interface from the preferred group of business LLMs.

5. The computer-implemented method of claim 4, wherein at least one of the one or more interoperability configuration inputs received from the user is provided by the user as an unstructured natural language input specifying the one or more candidate business LLMs to add to the preferred group of business LLMs.

6. The computer-implemented method of claim 1, wherein processing the natural language query to generate the different respective prompt for the corresponding business LLM among the two business LLMs includes converting the natural language query into a respective natural language prompt that permits the assistant interface to communicate with the corresponding business LLM via natural language, the respective natural language prompt comprising the different respective prompt specifically formulated for the corresponding business LLM to fulfill performance of the corresponding portion of the action.

7. The computer-implemented method of claim 1, wherein processing the natural language query to generate the different respective prompt for the corresponding business LLM among the one or more business LLMs includes converting the natural language query into a respective soft prompt specifically formulated to include a prompt structure advertised by the corresponding business LLM.

8. The computer-implemented method of claim 1, wherein:
the assistant interface comprises a personal LLM having an encoder network and a decoder network; and
the respective adaptation model associated with the corresponding business LLM comprises a prefix to the decoder of the assistant LLM.

9. The computer-implemented method of claim 1, wherein the operations further comprise, in response to selecting each corresponding business LLM among the two business LLMs selected by the assistant interface, activating the respective adaptation model associated with the corresponding business LLM.

10. The computer-implemented method of claim 1, wherein:
the two business LLMs selected by the assistant interface comprise a first business LLM and a second business LLM, the first business LLM operated by a first cloud provider and the second business LLM operated by a second cloud provider different than the first cloud provider; and
the different respective prompt structured from the natural language query for the first business LLM is formatted differently than the different respective prompt structured from the natural language query for the second business LLM.

11. The computer-implemented method of claim 1, wherein the operations further comprise, after providing the presentation content for output from the user device:
receiving user feedback indicating user dissatisfaction with the corresponding response content conveying details regarding performance of the corresponding portion of the action fulfilled by a corresponding one of the two business LLMs selected by the assistant interface;
determining a loss based on the corresponding response content and the user feedback indicating user dissatisfaction with the corresponding response content; and
activating the different respective adaptation model associated with the corresponding business LLM to fine-tune the different respective prompt specifically formulated for the corresponding business LLM by updating gradients of the different respective prompt based on the loss while parameters of the corresponding business LLM remain fixed.

12. A system comprising:
data processing hardware; and
memory hardware in communication with the data processing hardware and storing instructions that when executed on the data processing hardware causes the data processing hardware to perform operations comprising:
receiving, at an assistant interface, a natural language query input by a user to a user device, the natural language query specifying an action for the assistant interface to perform on behalf of the user;
selecting, by the assistant interface, two business large language models (LLMs) for the assistant interface to interact with to fulfill performance of the action, each corresponding business LLM of the two business LLMs:
selected to fulfill performance of a corresponding portion of the action; and
associated with a different respective adaptation model, the adaptation model published by the corresponding business LLM for use by the assistant interface to structure the natural language query into a different respective prompt specifically formulated for the corresponding business LLM to fulfill performance of the corresponding portion of the action;
for each corresponding business LLM among the two business LLMs selected by the assistant interface:
activating, by the assistant interface, the different respective adaptation model published by the corresponding business LLM;
processing, by the assistant interface, using the activated different respective adaptation model, the natural language query to generate the different respective prompt specifically formulated for the corresponding business LLM to fulfill performance of the corresponding portion of the action;
issuing, by the assistant interface, for input to the corresponding business LLM, the different respective prompt specifically formulated for the corresponding business LLM to fulfill performance of the corresponding portion of the action while the assistant interface issues, for input to the other business LLM among the two business LLMs selected by the assistant interface, the other different respective prompt specifically formulated for the other business LLM to fulfill performance of the portion of the action corresponding to the other business LLM; and
receiving, at the assistant interface, from the corresponding business LLM, corresponding response content conveying details regarding performance of the corresponding portion of the action; and
providing, for output from the user device, presentation content based on the corresponding response content received from each corresponding business LLM of the selected two business LLMs.

13. The system of claim 12, wherein the operations further comprise presenting, for output from the user device, selection information associated with the two business LLMs selected by the assistant interface, the selection information indicating, for each corresponding business LLM of the two business LLMs:

a name of the corresponding business LLM; and a description of the corresponding portion of the action the corresponding business LLM will perform on behalf of the user.

14. The system of claim 12, wherein one of the two business LLMs selected by the assistant interface for the assistant interface to interact with to fulfill performance of the action is selected to fulfill performance of at least two different corresponding portions of the action.

15. The system of claim 12, wherein the operations further comprise:

receiving, at the assistant interface, one or more interoperability configuration inputs, each interoperability configuration input specifying one or more candidate business LLMs to add to a preferred group of business LLMs for the assistant interface to interact with to fulfill actions on behalf of the user, wherein at least one of the two business LLMs selected by the assistant interface for the assistant interface to interact with to fulfill performance of the action are selected by the assistant interface from the preferred group of business LLMs.

16. The system of claim 15, wherein at least one of the one or more interoperability configuration inputs received from the user is provided by the user as an unstructured natural language input specifying the one or more candidate business LLMs to add to the preferred group of business LLMs.

17. The system of claim 12, wherein processing the natural language query to generate the different respective prompt for the corresponding business LLM among the two business LLMs includes converting the natural language query into a respective natural language prompt that permits the assistant interface to communicate with the corresponding business LLM via natural language, the respective natural language prompt comprising the different respective prompt specifically formulated for the corresponding business LLM to fulfill performance of the corresponding portion of the action.

18. The system of claim 12, wherein processing the natural language query to generate the different respective prompt for the corresponding business LLM among the one or more business LLMs includes converting the natural language query into a respective soft prompt specifically formulated to include a prompt structure advertised by the corresponding business LLM.

19. The system of claim 12, wherein:

the assistant interface comprises a personal LLM having an encoder network and a decoder network; and the respective adaptation model associated with the corresponding business LLM comprises a prefix to the decoder of the assistant LLM.

20. The system of claim 12, wherein the operations further comprise, in response to selecting each corresponding business LLM among the two business LLMs selected by the assistant interface, activating the respective adaptation model associated with the corresponding business LLM.

21. The system of claim 12, wherein:

the two business LLMs selected by the assistant interface comprise a first business LLM and a second business LLM, the first business LLM operated by a first cloud provider and the second business LLM operated by a second cloud provider different than the first cloud provider; and the different respective prompt structured from the natural language query for the first business LLM is formatted differently than the different respective prompt structured from the natural language query for the second business LLM.

22. The system of claim 12, wherein the operations further comprise, after providing the presentation content for output from the user device:

receiving user feedback indicating user dissatisfaction with the corresponding response content conveying details regarding performance of the corresponding portion of the action fulfilled by a corresponding one of the two business LLMs selected by the assistant interface;

determining a loss based on the corresponding response content and the user feedback indicating user dissatisfaction with the corresponding response content; and activating the different respective adaptation model associated with the corresponding business LLM to fine-tune the different respective prompt specifically formulated for the corresponding business LLM by updating gradients of the different respective prompt based on the loss while parameters of the corresponding business LLM remain fixed.

* * * * *